US009495548B2

United States Patent
Bousquet

(10) Patent No.: US 9,495,548 B2
(45) Date of Patent: *Nov. 15, 2016

(54) METHOD FOR ROUTING A MESSAGE

(71) Applicant: OBERTHUR TECHNOLOGIES, Colombes (FR)

(72) Inventor: Nicolas Bousquet, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,838

(22) Filed: Nov. 26, 2013

(65) Prior Publication Data
US 2014/0150110 A1 May 29, 2014

(30) Foreign Application Priority Data
Nov. 27, 2012 (FR) ...................... 12 61303

(51) Int. Cl.
*G06F 21/60* (2013.01)
*G06F 21/57* (2013.01)
*G06F 21/53* (2013.01)
(Continued)

(52) U.S. Cl.
CPC .............. *G06F 21/606* (2013.01); *G06F 21/53* (2013.01); *G06F 21/554* (2013.01); *G06F 21/556* (2013.01); *H04W 12/08* (2013.01); *G06F 9/544* (2013.01); *G06F 2221/2149* (2013.01)

(58) Field of Classification Search
CPC ...... G06F 21/606; G06F 21/57; G06F 21/53; G06F 21/556; G06F 21/554; G06F 9/544; G06F 2221/2149; H04L 29/08; H04L 29/06979; H04W 4/14; H04W 12/08; H04W 4/003

USPC ......... 726/4, 21, 24–30, 17; 455/412.1, 466; 709/203, 238; 713/1, 2, 100
See application file for complete search history.

(56) References Cited

U.S. PATENT DOCUMENTS 7,478,173 B1 1/2009 Delco
2004/0203614 A1* 10/2004 Qu et al. .................... 455/412.1
(Continued)

FOREIGN PATENT DOCUMENTS

EP 2173060 A1 4/2010
WO 2008/077628 7/2008

OTHER PUBLICATIONS

John O'Hara, Toward a Commodity Enterprise Middleware, ACM, 2007.*
(Continued)

*Primary Examiner* — Shanto M Abedin
(74) *Attorney, Agent, or Firm* — MH2 Technology Law Group, LLP

(57) ABSTRACT

A method for routing at least one message, this method being implementation-dependent on a trusted operating system of an electronic device comprising an electronic assembly on which the trusted operating system and a Rich-OS operating system are executed. The method may include operations for consulting a trusted memory of a terminal, which may be called a first memory, and when the first memory contains a message, determining the operating system targeted by the message from among at least the Rich-OS operating system and the trusted operating system. And when the message targets the Rich-OS system, transferring the message from the first memory to a memory accessible to the Rich-OS system, which may be called a second memory.

19 Claims, 5 Drawing Sheets

(51) Int. Cl.
*G06F 21/55* (2013.01)
*H04W 12/08* (2009.01)
*G06F 9/54* (2006.01)

(56) References Cited

U.S. PATENT DOCUMENTS

| | | | |
|---|---|---|---|
| 2006/0184609 A1* | 8/2006 | Deng | 709/203 |
| 2007/0202884 A1* | 8/2007 | Nykanen et al. | 455/455 |
| 2008/0051122 A1 | 2/2008 | Fisher | |
| 2009/0098875 A1* | 4/2009 | De Beer | 455/445 |
| 2010/0031325 A1* | 2/2010 | Maigne et al. | 726/4 |
| 2010/0333008 A1 | 12/2010 | Rogel et al. | |
| 2011/0066836 A1* | 3/2011 | Iguchi | G06F 9/4406 713/2 |
| 2012/0021785 A1 | 1/2012 | Weinrib | |
| 2012/0282954 A1* | 11/2012 | Zhu | 455/466 |
| 2014/0007120 A1* | 1/2014 | Spitz | 718/102 |
| 2014/0095918 A1* | 4/2014 | Stahl | G06F 21/725 713/500 |
| 2014/0237621 A1* | 8/2014 | Spitz | G06F 21/62 726/26 |

OTHER PUBLICATIONS

Search Report dated Aug. 22, 2013 from French Patent Application No. 1261303 filed Nov. 27, 2012, pp. 1-2.
Selhorst, Marcel et al. Towards a Trusted Mobile Desktop. Trust and Trustworthy Computing, Jun. 21, 2010, pp. 1-17, Springer, Berlin, Germany.
Preliminary Search Report dated Sep. 16, 2013, French Patent Application No. 1261302, pp. 1-2.
Chris Wolf, "Let's Get Virtual: A Look at Today's Server Virtualization Architecture", Burton Group Data Center Strategies—In-Depth Overview, Version 1, 2007, pp. 1-42.

* cited by examiner

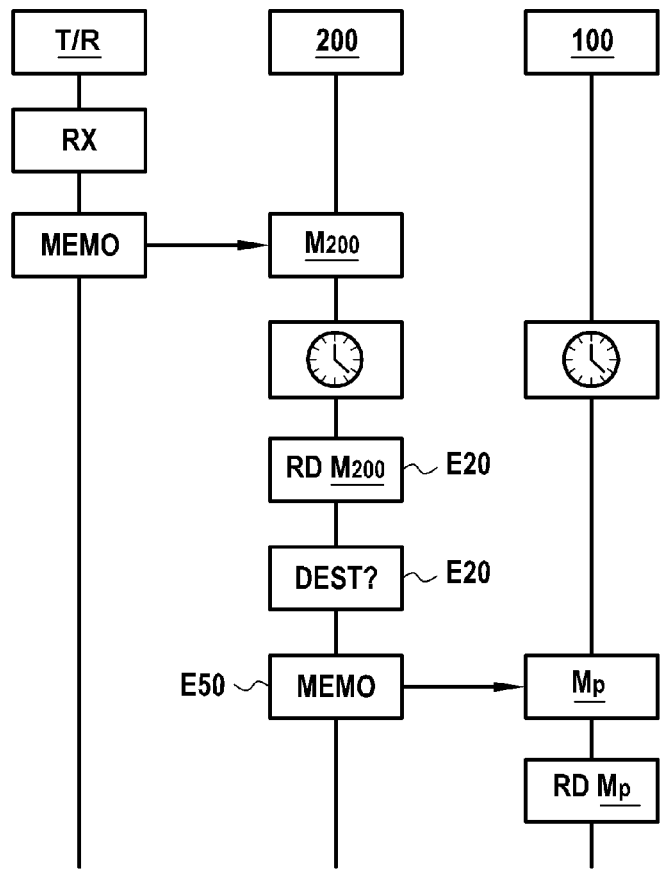
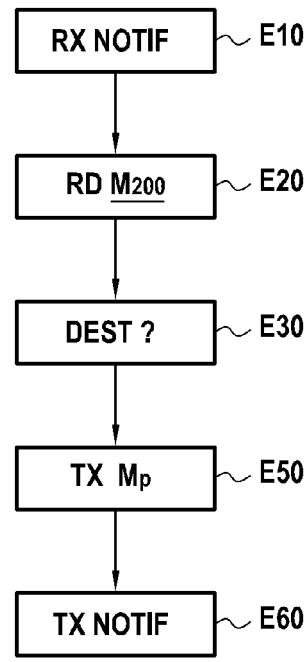
FIG.2
FIG.3

METHOD FOR ROUTING A MESSAGE

CROSS-REFERENCE TO RELATED APPLICATIONS

This application claims priority to French Patent Application No. 1261303 filed Nov. 27, 2012, the entire disclosure of which is hereby incorporated by reference in its entirety.

BACKGROUND OF THE INVENTION

The present invention lies within the field of the sending and receiving of messages via an electronic device, for example a terminal or smartcard comprising several execution environments of which at least one is a trusted execution environment and another is a Rich-OS execution environment. It is recalled that execution environments, whether trusted or Rich-OS, comprise or are included in electronic assemblies of chipset or System-on-Chip type.

A trusted execution environment is implemented by means of a secure processor, possibly being a processor dedicated to this task or possibly having other functions, and a secure rewrite non-volatile memory; it is based on a trusted operating system.

Similarly, a Rich-OS execution environment is based on a rich operating system allowing the execution of applications of various origins such as the Internet.

At the present time, when a message is received by the transmitter-receiver of an electronic device, it is either transmitted to elements controlled by the Rich-OS operating system run on this device e.g. a screen or memory, or if the device detects that the message is received by a secure communication it is transmitted to a secure element embedded or inserted in the aforementioned device such as described in document US Patent Publ. No. 2008/0051122.

However, in the case of an electronic device of the aforementioned type i.e. comprising a trusted execution environment, when a message is intended for the trusted execution environment or one of the applications thereof, it is possible that a malicious application of the Rich-OS operating system retains or destroys the message which is therefore not transmitted to the trusted operating system. In this case the term denial-of-service is used.

There is therefore a need to improve the routing methods of messages intended for a trusted operating system or one of its applications.

OBJECTIVE AND SUMMARY OF THE INVENTION

The present invention mainly sets out to solve the above-mentioned drawbacks.

For this purpose the invention concerns a method for routing at least one message, this method being implementation-dependent on a trusted operating system of an electronic device comprising an electronic assembly on which the trusted operating system and a Rich-OS operating system are executed. This method comprises a step to consult a trusted memory of the electronic device, called first memory, and when this first memory contains a message a step to determine the operating system targeted by the message from among at least the Rich-OS operating system and the trusted operating system, and if this message targets the Rich-OS system a step to transfer this message from the first memory to a memory accessible to the Rich-OS system, called second memory.

The invention also concerns an electronic assembly for electronic device, a trusted operating system and a Rich-OS system executed thereupon, and the electronic assembly comprising a consultation module to consult a trusted memory of the electronic device, called first memory and able to contain at least one message, and a determination module to determine the operating system targeted by this message, a transfer module to transfer this message from the first memory to a memory accessible to the Rich-OS system, called second memory, when this message targets the Rich-OS system, these three modules being implementation-dependent on the trusted operating system.

Therefore one of the major advantages of the invention is to avoid denial-of-service since the trusted operating system has first access to messages, contrary to the prior art in which the messages are transmitted to elements controlled by the Rich-OS system or one of the applications thereof, so that the targeted operating system is determined in secure manner by the trusted operating system without any malicious application being able to take possession of a message if it is intended for the trusted operating system or an application thereof.

In one particular embodiment of the invention, the consulting step takes place in response to notification given of receipt of a message via a dedicated channel between a notifier of the electronic device and the trusted operating system. In this embodiment the consultation module acts in reaction to receipt of notification of the receiving of a message via a dedicated channel between a notifier of the electronic device and the trusted operating system.

The use of a dedicated channel makes it possible to prevent the Rich-OS system from intercepting the notification. This channel may be logic for example, or physical.

As a variant, the consultation step is automatically implemented at regular intervals. In this embodiment, the consultation module is set in operation automatically at regular intervals.

In one particular embodiment of the invention, when the message is intended for the Rich-OS system the method comprises a step to send a notification informing a notifier of the electronic device that the message is intended for the Rich-OS system. In this embodiment, the electronic assembly comprises a module to send notification informing a notifier of the electronic device that the message is intended for the Rich-OS system.

Thereafter, the notifier can then inform the Rich-OS system of receipt of a message intended for this system.

In one particular embodiment of the invention, the message comprises a frame and the determination step comprises a step to read a recipient field of the frame or of the message to identify the targeted operating system. In this embodiment, the determination module comprises means for reading a recipient field of this frame or of the message to identify the targeted operating system.

The determination step may then further comprise a step to obtain the address of communication means of the execution environment of the targeted operating system, from a destination address included in the recipient field of the frame or of the message, the destination address being read during the reading step. In this embodiment, the determination module may comprise means for obtaining the address of communication means of the execution environment of the targeted operating system, from a destination address included in the recipient field of the frame or message, the destination address being read by the reading means.

In one embodiment, the address-obtaining step is performed by reading the address of the communication means in a look-up table memorised in a memory accessible to the trusted operating system. In this embodiment, the address-obtaining means read the address of the communication means in a look-up table memorised in a memory accessible to the trusted operating system.

The invention also covers the routing of messages of the type of those received by the communication protocols used in mobile telephony or any other wireless communication protocol.

As a variant, the determination step comprises a step to interpret an instruction contained in the message. In this embodiment, the determination module comprises means for interpreting an instruction contained in the message.

For example, the determination means can infer the operating system targeted by the message from the type of instruction.

The invention also concerns a terminal comprising an electronic assembly such as described above. This terminal may a mobile telephony terminal.

As a variant, this terminal may be a laptop computer or touchpad. This terminal may also be a self-standing or embedded intelligent system widely used in architectures of machine-to-machine type, e.g. the on-board computer of a vehicle.

In one particular embodiment of the invention, this terminal comprises a notifier, a transmitter-receiver, and a dedicated communication channel between this notifier and the transmitter-receiver via which the transmitter-receiver sends the message to the notifier for memorisation thereof by the notifier in the first memory.

In one particular embodiment of the invention, the electronic assembly comprises the notifier.

The electronic assembly may be a chipset of the terminal.

In one particular embodiment of the invention, the aforementioned steps of the method are determined by the instructions of a computer program.

The invention therefore also concerns a computer program comprising instructions for implementing the steps of the method such as described above, when the program is executed by a processor. This program can use any programming language, for example in the form of a source code or object code. The program can be compiled and/or interpreted or in any other form interpretable by a processor.

In one particular embodiment of the invention, this computer program is the trusted operating system.

In another embodiment of the invention, this computer program is a patch on the trusted operating system. The advantage of this patch is that it enriches existing APIs and forms an alternative to a native application of the trusted operating system when a said application is not able to offer some services when it is deployed, or to a native application which cannot be deployed. Said patch therefore offers additional functionalities not initially offered by the trusted operating system.

The invention also relates to a data medium readable by a computer and comprising the instructions of a computer program such as mentioned above.

This data medium can be any entity or device, embedded or removable, capable of storing the program. For example the medium may be a storage means such as a ROM memory, CD-ROM or ROM of a micro-electronic circuit, or even magnetic recording means e.g. a hard disk, a memory of flash type or RAM.

Additionally, the data medium may be a transmissible medium such as an electrical or optical signal which can be conveyed via an electrical or optical cable, via radio or via other means. The program of the invention may in particular be downloaded onto an on-line storage space or onto an Internet platform.

Alternatively, the data medium may be an integrated circuit in which the computer program is incorporated, the circuit being adapted to execute or to be used in the execution of the method under consideration.

BRIEF DESCRIPTION OF THE DRAWINGS

Other characteristics and advantages of the present invention will become apparent from the description given below, with reference to the appended drawings illustrating an example of embodiment thereof that is in no way limiting. In the Figures:

FIG. 2 in the form of a flow chart illustrates the main steps of a routing method according to a first embodiment of the invention, which can be implemented in the terminal in FIG. 1C;

FIG. 3 in the form of a flow chart illustrates the main steps of a routing method according to a second embodiment of the invention which can be implemented in the terminal shown in FIG. 1A or in FIG. 1B;

DETAILED DESCRIPTION OF THE INVENTION

Figure 1A:
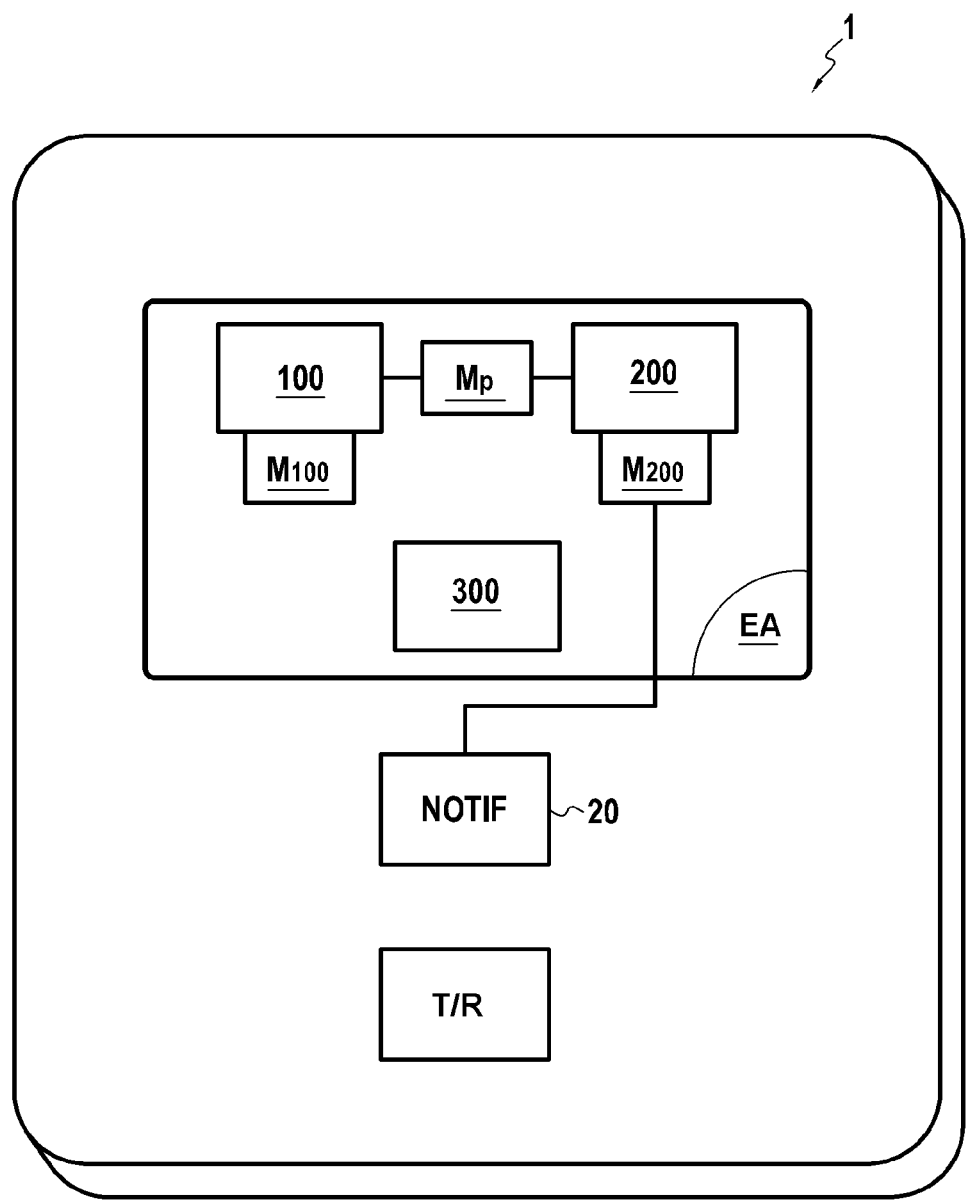
FIGS. 1A, 1B and 1C schematically illustrate an electronic device according to three embodiments of the invention.

FIG. 1A illustrates an electronic device 1 according to one embodiment of the invention. In this example, the electronic device is a terminal e.g. a touch pad, laptop computer or cell phone.

As a variant, it could have been a device of machine-to-machine type such as an on-board computer in a vehicle, or a smart card such as a bank card or electronic identity document.

In the example shown in FIG. 1A, the terminal comprises a notifier 20 and a transmitter-receiver T/R and an electronic assembly EA in the meaning of the invention.

The notifier 20 is a material component comprising a microprocessor. It is capable of sending and receiving notifications via dedicated channels that are previously initialised either with the transmitter-receiver T/R, or with the different operating systems to inform them of receipt of a message.

The electronic assembly EA which may form a chipset of the terminal 1 (this chipset may be on a System-On-Chip of the terminal), contains the code of two operating systems, namely a Rich-OS system 100 and a trusted operating system 200, each having its own memory respectively $M_{100}$ and $M_{200}$ and a processor 300 executing the code of these operating systems.

In particular, these two operating systems are jointly set in operation on start-up of the terminal 1. As is known to persons skilled in the art, the secure execution environment of the trusted operating system 200 has a secure start-up mechanism or Secure Boot which consists of authenticating the trusted operating system 200 and then initialising this system i.e. the launching thereof followed by start-up of the Rich-OS operating system 100.

More specifically, Secure Boot is a chain of steps leading to complete start-up of the terminal, each step validating the following. Therefore, step i+1 is only triggered if step i validates the transition.

However, active operation in opposition to stand-by of each of the operating systems is exclusive. This means that when one of the operating systems is active, the other is in inactive mode.

The electronic assembly also comprises a memory $M_P$ shared between the trusted operating system and the Rich-OS system. This memory is used to store a message intended for the Rich-OS system 100 that has been previously received then routed by the trusted operating system 200.

Therefore in this embodiment, when the transmitter-receiver T/R receives a message, it transmits it directly to the notifier 20 which memorises the same via a dedicated channel in a trusted memory namely, in this example, the own memory $M_{200}$ of the trusted operating system 200.

The trusted operating system 200 then performs routing of this message. The memory $M_{200}$ may additionally form a medium for storing the computer program comprising instructions for implementing the steps of the routing method such as described below with reference to FIGS. 2 and 3.

Figure 1B:
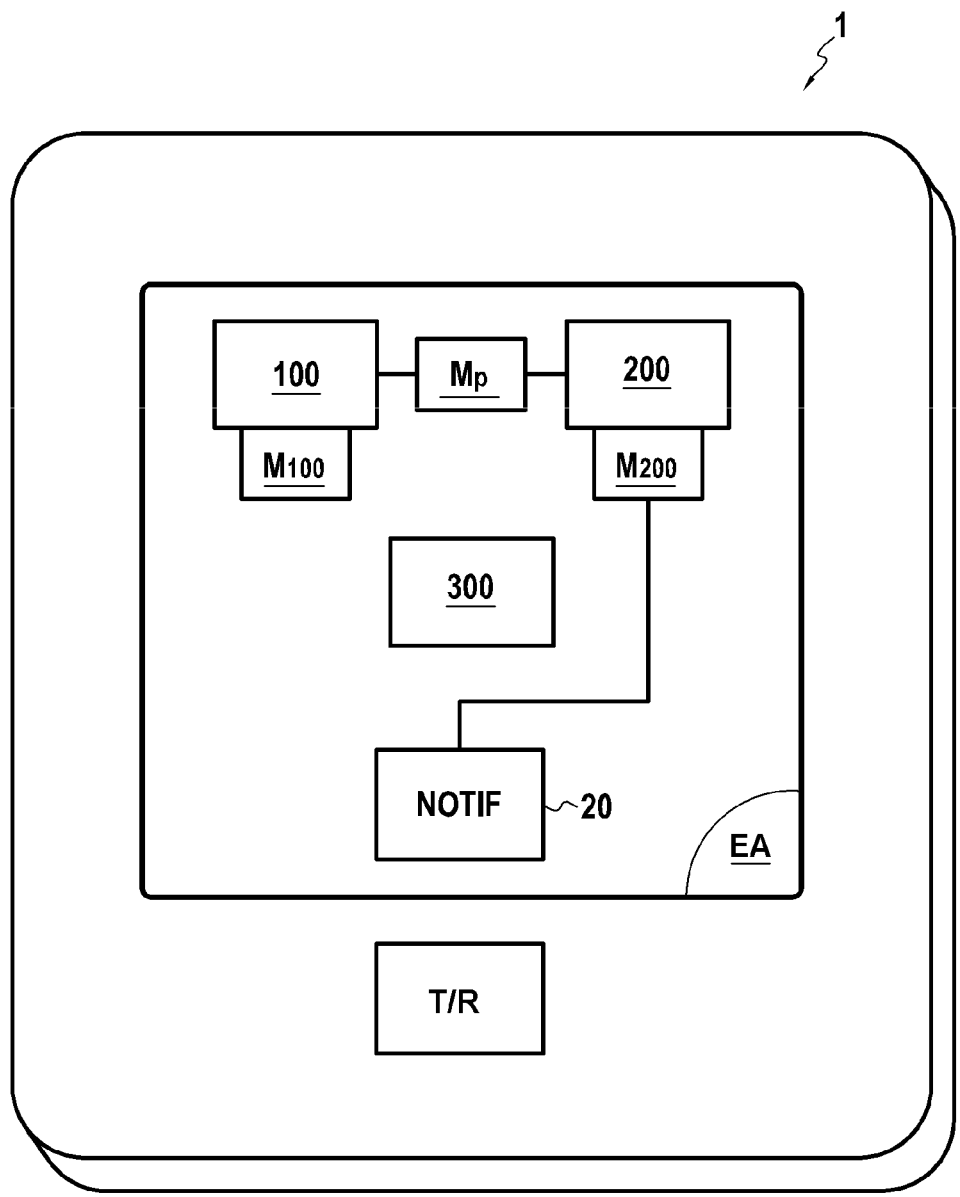

FIG. 1B shows a terminal 1 conforming to a second embodiment of the invention. This embodiment differs from the one in FIG. 1A in that the electronic assembly EA comprises the notifier 20.

As a variant, the transmitter-receiver T/R could also be contained in the electronic assembly EA. In this manner the notifier and transmitter-receiver would both be integrated in the electronic assembly.

Figure 1C:
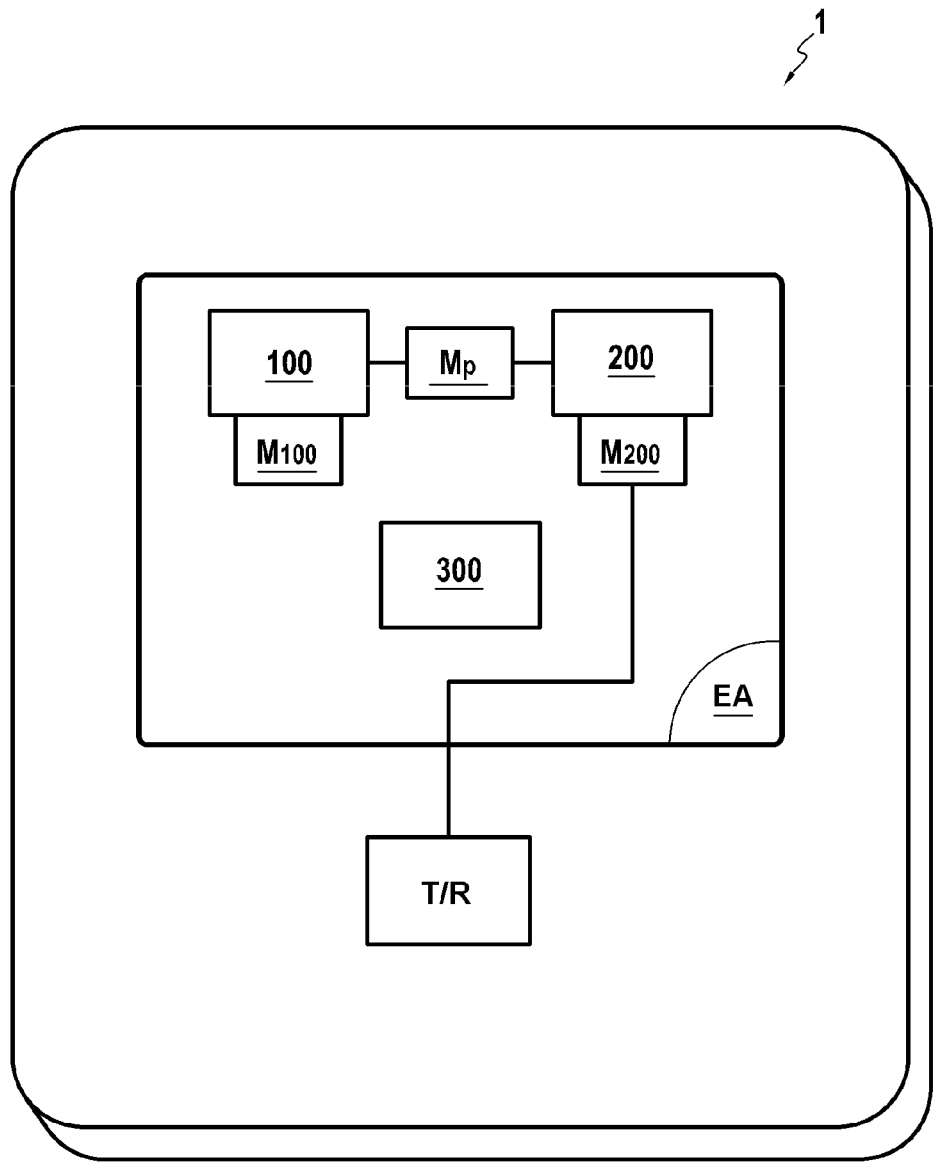

FIG. 1C illustrates a terminal 1 conforming to a third embodiment of the invention. This mode differs from the one in FIGS. 1A and 1B in that the terminal does not comprise a notifier.

In this embodiment, the transmitter-receiver T/R directly memorises the received message in a trusted memory, in this example the own memory $M_{200}$ of the trusted operating system 200, via a dedicated channel.

FIG. 2 gives the main steps of a routing method according to a first embodiment of the invention, which can be implemented in a terminal such as previously described with reference to FIG. 1C.

Initially, the transmitter-receiver T/R receives a message. It memorises this message in the memory $M_{200}$ via a dedicated channel, this channel having previously been initialised.

More specifically, initialisation of a channel consists of initialising a context then of starting up a communication session.

In this embodiment, the trusted operating system 200 regularly consults the memory $M_{200}$ during a step E20.

In practice, the frequency of consultation can be determined either by a clock marking the switch-over (to active mode) of the Rich-OS system to the trusted operating system, or by receipt of a specific polling instruction. The latter case is not illustrated.

As a variant, the consulting of this memory by the trusted operating system 200 can be prompted subsequent to certain action by the user of the terminal or by an application of the Rich-OS system.

If the memory $M_{200}$ contains a message, the trusted operating system 200 sets about determining the actual recipient, at a step E30.

Figure 4:
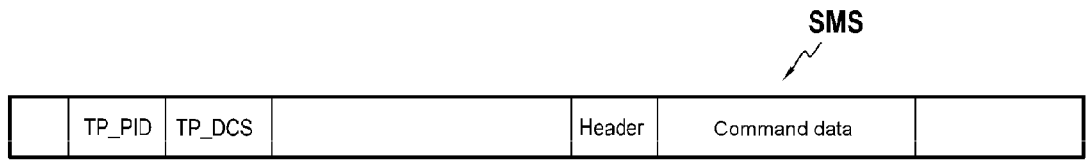
FIGS. 4, 5A and 5B schematically illustrate examples of a message according to the invention, namely SMS frames using the TCP/IP protocol and Bluetooth.

In a first example, it is assumed that the message is an SMS in PDU mode and comprising a TP_DCS field, such as illustrated in FIG. 4.

The present invention proposes modifying the GSM 03.40 standard known to persons skilled in the art and according to which the TP_DCS filed is encoded on 8 bits, so as to add a class corresponding to the trusted operating system.

Returning to our first example, a determination module of the trusted operating system reads this TP_DCS field and by means of the class contained in this field can determine the operating system targeted by this message.

Figure 5A:
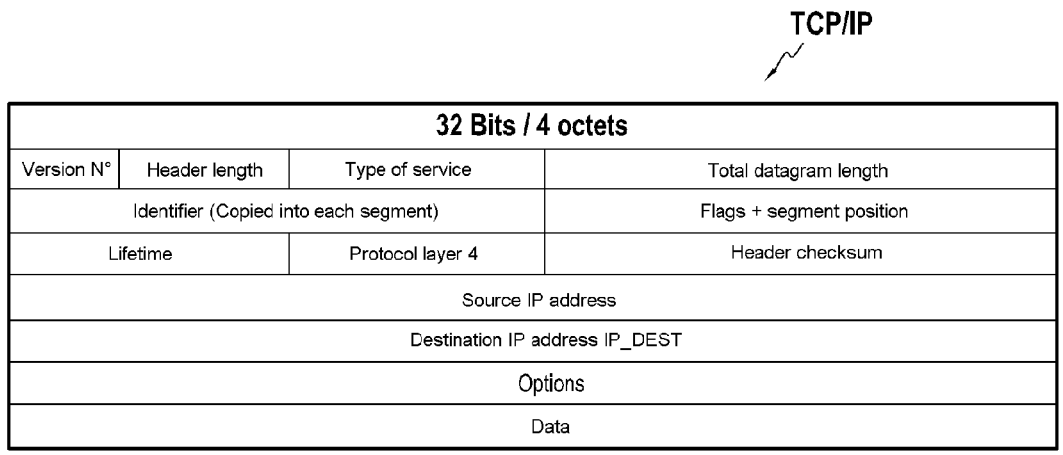

In a second example, it is assumed that the message is a frame as per the TCP/IP protocol comprising a IP_DEST field, such as illustrated in FIG. 5A.

In manner known to skilled persons, this field comprises the destination IP address of the message.

Within the context of the invention, the execution environment of the Rich-OS system and the execution environment of the trusted operating system each comprise communication means identified by their MAC address (Media Access Control).

Returning to our second example, a determination module of the trusted operating system reads this IP_DEST field.

In order to identify the targeted operating system, it is necessary to obtain the MAC address corresponding to the IP_DEST address.

To do so, the trusted operating system transmits a request of ARP type (Address Resolution Protocol) to the communication means of each of the aforementioned execution environments.

It is specified that in manner known to persons skilled in the art, the communication means having the IP address corresponding to the IP_DEST address answer the ARP request by specifying their MAC address.

In this manner, the trusted operating system is able to memorise the IP/MAC matches in a look-up table memorised for example in its own memory $M_{200}$ or in the shared memory $M_P$, thereby facilitating the routing of subsequent messages.

As a variant, a predefined IP/MAC look-up table could be memorised in the shared memory $M_P$ for example, so that all that is required is to read the MAC address therein which corresponds to the IP address in order to identify the targeted operating system via the communication means of its execution environment.

In practice, once the MAC address of the targeted operating system is obtained, the frame is re-packaged in an Ethernet frame and transmitted to the communication means characterised by this MAC address.

In general, the routing implemented in this example takes place in layer 2 of the OSI model.

Figure 5B:
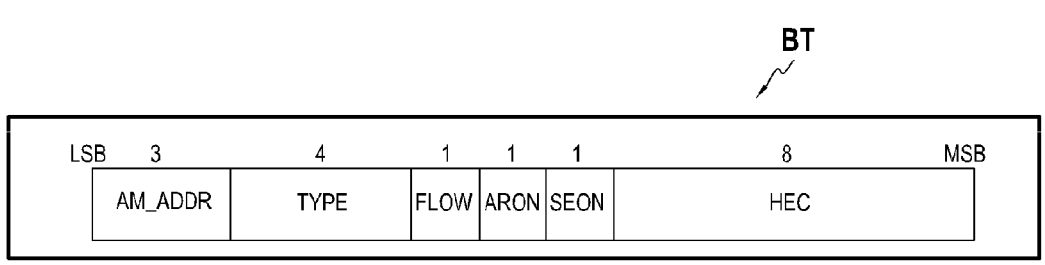

In one possible variant of this second example, the message is not a frame as per the TCP/IP protocol, but a Bluetooth BT frame containing an AM_ADDR field, such as illustrated in FIG. 5B.

In manner known to the skilled person, this AM_ADDR field contains a local address which characterises a Bluetooth network node called Piconet. This local network address is associated with a BD_ADDR address identifying each terminal on initialisation of the Piconet.

In this variant, the trusted operating system seeks to obtain the characteristic BD_ADDR address of the communication means of the execution environment of the targeted operating system, in similar manner to obtaining the MAC address in the preceding example.

In a third example, a determination module of the trusted operating system interprets the instructions contained in the message. In practice, this interpretation is based on a list of instructions or function signatures allowing recognition of the targeted operating system as a function of the signature of the instruction or of an imprint contained in the message.

Unlike in the two preceding examples in which the determining of the targeted operating system was based on the interpretation of metadata (recipient field) of the message, determination here is based on interpretation of the data themselves (signature, imprint).

Therefore, depending on the whether or not the instruction is of secure type for example, it is possible to infer therefrom that the trusted operating system is targeted by this message.

In general, the invention covers the determining of the targeted operating system by a message via the interpretation of a tag located in the body or header of this message.

The invention also covers the routing of messages of the type of those received by the communication protocols used in mobile telephony or in any other wireless communication protocol.

In the remainder of the description of this embodiment, it is considered that the recipient of the message is the Rich-OS operating system 100.

At a step E50, a module of the trusted operating system 200 memorises the message in the shared memory $M_P$, accessible to the Rich-OS system 100.

As a variant, the trusted operating system 200 has the possibility of accessing the own memory $M_{100}$ of the Rich-OS system 100.

Therefore the Rich-OS operating system 100 may subsequently consult this memory to obtain its message.

This consulting can be performed regularly. In practice, the frequency of consultation can be determined either by a clock marking the switch-over (to active mode) from the trusted operating system to the Rich-OS system, or by receipt of a specific polling command. This latter case is not illustrated.

As a variant, the consulting of this memory by the Rich-OS operating system 100 can be prompted subsequent to certain action by the user of the terminal or by an application.

FIG. 3 illustrates the main steps of a routing method according to a second embodiment of the invention, able to be implemented in a terminal such as previously described with reference to FIG. 1A or 1B.

When the transmitter-receiver T/R of the terminal 1 receives a message, it sends this message to the notifier 20 which memorises the same via a dedicated channel in a trusted memory, here the own memory $M_{200}$ of the trusted operating system 200.

Next, at a step E10, the trusted operating system 200 receives notification of receipt of a message, this notification originating from the notifier 20.

At a step E20, the trusted operating system 200 therefore consults its memory $M_{200}$.

At step E30, the trusted operating system 200 determines the operating system effectively targeted by the message, as described previously with reference to FIG. 2.

If the message is dedicated to this trusted operating system 200, this system retrieves the message.

In this example the contrary case is considered i.e. the case in which the message is addressed to the Rich-OS system 100.

At step E50, the trusted operating system 200 memorises the message in a shared memory $M_P$ with the Rich-OS operating system 100.

The trusted operating system 200 then (step E60) sends a notification to the notifier 20 informing it that the message is intended for the Rich-OS system.

Thereafter, the notifier can thus inform the Rich-OS system of the receipt of a message intended for it so that when this Rich-OS system wakes up it consults the shared memory $M_P$ in which the message is stored, this wake-up possibly occurring regularly on a clock signal or on receipt of an instruction sent by the notifier.

What is claimed is:

1. A method for routing at least one message, the method being implementation-dependent on a trusted operating system of an electronic device comprising an electronic assembly on which the trusted operating system and a Rich-OS operating system are executed, the method comprising:
   consulting, using the trusted operating system, a first memory of a terminal when the first memory contains a message and the first memory is only accessible to the trusted operating system, wherein the consulting is performed in response to receipt of the message via a dedicated channel between a notifier of the electronic device and the trusted operating system;
   determining, using the trusted operating system, an operating system targeted by the message from among at least the Rich-OS operating system and the trusted operating system; and
   when the message targets the Rich-OS operating system, transferring, using the trusted operating system, the message from the first memory to a second memory accessible to the Rich-OS operating system.

2. The routing method according to claim 1, further comprising:
   when the message is intended for the Rich-OS operating system, sending a notification informing the notifier of the electronic device that the message is intended for the Rich-OS operating system.

3. The routing method according to claim 1, wherein the message comprises a frame and
   wherein the determining comprises reading a recipient field of the frame or of the message to identify the operating system targeted by the message.

4. The routing method according to claim 3, wherein determining further comprises:
   obtaining an address of a communication means of the execution environment of the operating system targeted by the message, from a destination address included in the recipient field of the frame or of the message, the destination address being read during the reading.

5. The routing method according to claim 4, wherein the obtaining is performed by reading the address of the communication means in a look-up table stored in a third memory accessible to the trusted operating system.

6. The routing method according to claim 1, wherein the determining comprises interpreting a command contained in the message.

7. A non-transitory computer-readable medium containing instructions that, when executed by a processor, perform a method implemented on a trusted operating system of an electronic device that comprises an electronic assembly on which the trusted operating system and a Rich-OS operating system are executed, the method comprising:
   consulting, using the trusted operating system, a first memory of a terminal when the first memory contains a message and the first memory is only accessible to the trusted operating system, wherein the consulting is performed in response to receipt of the message via a dedicated channel between a notifier of the electronic device and the trusted operating system;

determining, using the trusted operating system, an operating system targeted by the message from among at least the Rich-OS operating system and the trusted operating system; and when the message targets the Rich-OS operating system, transferring, using the trusted operating system, the message from the first memory to a second memory accessible to the Rich-OS operating system.

8. The non-transitory computer-readable medium according to claim 7, wherein the instructions form at least a portion of the trusted operating system.

9. The non-transitory computer-readable medium according to claim 7, wherein the instructions form a patch on the trusted operating system.

10. An electronic assembly for an electronic device, wherein a trusted operating system and a Rich-OS operating system are executed on the electronic assembly and wherein the electronic assembly comprises:

a module to consult, using the trusted operating system, a first memory of the electronic device, wherein the first memory is able to contain at least one message and the first memory is only accessible to the trusted operating system, wherein consulting is performed in response to receipt of a message via a dedicated channel between a notifier of the electronic device and the trusted operating system; and a module to determine, using the trusted operating system, an operating system targeted by the message; and a module to transfer, using the trusted operating system, the message from the first memory to a second memory accessible to the Rich-OS operating system when the message targets the Rich-OS operating system;

wherein the module to consult, the module to determine, and the module to transfer are execution-dependent on the trusted operating system.

11. A terminal comprising an electronic assembly wherein a trusted operating system and a Rich-OS operating system are executed on the electronic assembly and wherein the electronic assembly comprises:

a module to consult, using the trusted operating system, a first memory, wherein the first memory is able to contain at least one message and the trusted first memory is only accessible to the trusted operating system, wherein consulting is performed in response to receipt of a message via a dedicated channel between a notifier of the terminal and the trusted operating system; and a module to determine, using the trusted operating system, an operating system targeted by the message; and a module to transfer, using the trusted operating system, the message from the first memory to a second memory accessible to the Rich-OS operating system when the message targets the Rich-OS operating system;

wherein the module to consult, the module to determine, and the module to transfer are execution-dependent on the trusted operating system.

12. The terminal according to claim 11, comprising:
the notifier and
a transmitter-receiver comprising the dedicated channel between the notifier and the transmitter-receiver, via which the transmitter-receiver sends the message to the notifier such that the message is stored by the notifier in the first memory.

13. The terminal according to claim 12, wherein the electronic assembly comprises the notifier.

14. The terminal according to claim 12, wherein the electronic assembly is a chipset of the terminal.

15. The terminal according to claim 11, wherein the terminal is a mobile telephony terminal.

16. An electronic assembly for an electronic device comprising:

a first memory configured to contain at least one message and accessible only to a trusted operating system;

a second memory accessible to a Rich-OS operating system; and a processor configured to execute instructions to perform a method comprising:

consulting, using the trusted operating system, the first memory when the first memory contains a message, wherein the consulting is performed in response to receipt of the message via a dedicated channel between a notifier of the electronic device and the trusted operating system;

determining, using the trusted operating system, an operating system targeted by the message from among at least the Rich-OS operating system and the trusted operating system; and when the message targets the Rich-OS operating system, transferring, using the trusted operating system, the message from the first memory to the second memory accessible to the Rich-OS operating system.

17. The electronic assembly according to claim 16, wherein the instructions form at least a portion of the trusted operating system.

18. The electronic assembly according to claim 16, wherein the instructions form a patch on the trusted operating system.

19. The electronic assembly according to claim 16, wherein the electronic assembly is a chipset of the electronic device.

* * * * *